United States Patent
Nagayama et al.

(10) Patent No.: US 6,400,878 B1
(45) Date of Patent: Jun. 4, 2002

(54) OPTICAL FIBER AND METHOD OF MAKING THE SAME

(75) Inventors: Katsuya Nagayama; Yuichi Ohga; Tatsuhiko Saitoh; Shinji Ishikawa; Ichiro Tsuchiya; Takenori Uchiyama, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/939,742

(22) Filed: Aug. 28, 2001

(30) Foreign Application Priority Data

Aug. 28, 2000 (JP) .......................................... 2000-257850
Aug. 28, 2000 (JP) .......................................... 2000-257860

(51) Int. Cl.$^7$ ................................................. G02B 6/02
(52) U.S. Cl. ...................................................... 385/123
(58) Field of Search .......................................... 385/123

(56) References Cited

U.S. PATENT DOCUMENTS

| | | | | |
|---|---|---|---|---|
| 4,822,399 A | * | 4/1989 | Kanamori et al. | ............. 65/398 |
| 5,191,206 A | * | 3/1993 | Boiarski et al. | ....... 250/227.14 |
| 5,482,525 A | * | 1/1996 | Kajioka et al. | ................. 65/31 |
| 5,702,497 A | * | 12/1997 | Oh et al. | ...................... 65/412 |
| 5,717,209 A | * | 2/1998 | Bigman et al. | ......... 250/339.12 |
| 5,923,694 A | * | 7/1999 | Culver | ........................... 372/6 |
| 5,942,296 A | * | 8/1999 | Oh et al. | ..................... 385/124 |
| 6,343,175 B1 | * | 1/2002 | Sasaoka | ...................... 385/123 |

OTHER PUBLICATIONS

*The Transactions of the Institute of Electronics, Information and Communication Engineers*, "Relaxation of Raleigh Scattering in Silica Core Optical Fiber with Heat Treatment," Sakaguchi, 2000/1, vol. J83–C, No. 1, pp. 30–36.

*NTT Review*, "Low–loss Optical Fibers," Tajima, vol. 10, No. 6, pp. 109–113 (1998).

*Electronics Letters*, "Viscosity of F and GeO2 Codoped Silica Glass," Shiraki et al., vol. 29, No. 14, pp. 1263–1264 (1993).

*J. Opt. Soc. Am. A*, "Photoelastic computer tomography: a novel measurement method for axial residual stress profile in optical fibers," Abe et al., vol. 3, No. 1, pp. 133–138 (1986).

* cited by examiner

*Primary Examiner*—Akm E. Ullah
(74) *Attorney, Agent, or Firm*—McDermott, Will & Emery

(57) ABSTRACT

An optical fiber preform 2 having a viscosity ratio $R\eta=\eta_0/\eta_t$ of 2.5 or less between the core average viscosity $\eta_0$ and the total average viscosity $\eta_t$ is prepared, and is drawn by a drawing furnace 11 so as to yield an optical fiber 3, which is then heated to a temperature within a predetermined range so as to be annealed by a heating furnace 21 disposed downstream the drawing furnace 11. Here, upon annealing in the heating furnace 21, the fictive temperature Tf within the optical fiber lowers, thereby reducing the Rayleigh scattering loss. At the same time, the viscosity ratio condition of $R\eta \leq 2.5$ restrains the stress from being concentrated into the core, thereby lowering the occurrence of structural asymmetry loss and the like. Hence, an optical fiber which can reduce the transmission loss caused by the Rayleigh scattering loss and the like as a whole, and a method of making the same can be obtained.

14 Claims, 6 Drawing Sheets

OPTICAL FIBER AND METHOD OF MAKING THE SAME

BACKGROUND OF THE INVENTION

1. Field of the Invention

The present invention relates to an optical fiber for transmitting light, and a method of making the same.

2. Related Background Art

In the transmission of light using an optical fiber, the transmission loss (Rayleigh scattering loss) caused by Rayleigh scattering within the optical fiber becomes problematic. For this problem, an optical fiber which can reduce the Rayleigh scattering loss or a method of making the same has been proposed.

For example, "Sakaguchi, *the Transactions of the Institute of Electronics, Information and Communication Engineers*, 2000/1, Vol. J83-C, No. 1, pp. 30–36", discloses that the Rayleigh scattering loss in an optical fiber can be reduced by annealing the optical fiber after drawing. Namely, the Rayleigh scattering intensity within glass is not constantly fixed by materials thereof, but depends on a fictive temperature Tf which is a virtual temperature indicative of the randomness in the state of arrangement of atoms within glass. Specifically, the Rayleigh scattering intensity increases as the fictive temperature Tf within glass is higher (randomness is greater).

In this regard, when drawing an optical fiber preform upon heating, a heating furnace is installed downstream a drawing furnace and is heated such that the drawn optical fiber falls within a predetermined temperature range when passing through the heating furnace. As a consequence, the heating by use of the heating furnace prevents the drawn optical fiber from cooling drastically, whereby the optical fiber is annealed. Here, due to the structural relaxation of glass caused by rearrangement of atoms, the fictive temperature Tf within the optical fiber decreases, whereby the Rayleigh scattering intensity within the optical fiber is suppressed.

On the other hand, "K. Tajima, *NTT REVIEW*, Vol. 10, No. 6, pp. 109–113 (1998)", discloses that the Rayleigh scattering intensity is similarly suppressed by drawing at a low temperature.

SUMMARY OF THE INVENTION

However, conventionally proposed manufacturing methods which are effective in lowering Rayleigh scattering loss, such as the above-mentioned manufacturing method having an annealing process using a heating furnace, and the like are not considered to fully realize the reduction of transmission loss in the optical fiber. In particular, there has been a problem that even optical fibers prepared by the same manufacturing method yield a case where the transmission loss reducing effect is obtained and a case where the transmission loss is hardly reduced or increases to the contrary, whereby the transmission loss reducing effect cannot be obtained reliably.

The inventor repeated diligent studies concerning causes for the unreliability of reduction in transmission loss mentioned above and the like; and, as a result, has found that, even when the same manufacturing method capable of reducing the Rayleigh scattering loss is used, the resulting effect of reducing the transmission loss greatly varies depending on the configuration of the optical fiber or optical fiber preform to which the manufacturing method is applied.

In view of the foregoing problems, it is an object of the present invention to provide an optical fiber which can reliably reduce the transmission loss caused by Rayleigh scattering loss and the like, and a method of making the same.

In order to achieve such an object, the first optical fiber in accordance with the present invention comprises a core region, and a cladding region disposed at an outer periphery of the core region, wherein the core average viscosity $\eta_0$ at a cross section within the core region and the total average viscosity $\eta_t$ at a total cross section combining the core region and cladding region together have a viscosity ratio $R\eta = \eta_0/\eta_t$ of 2.5 or less, and wherein the optical fiber has a Rayleigh scattering loss which is 95% or less of a predetermined reference value.

In the above-mentioned optical fiber, a manufacturing method effective in reducing the Rayleigh scattering loss such as the manufacturing method with annealing is used, or an optical fiber material adapted to lower the Rayleigh scattering loss is chosen, for example, whereby the Rayleigh scattering loss is reduced by at least 5% from a reference value indicative of the Rayleigh scattering loss in a conventional optical fiber, so as to become a value not higher than 95%. Further, the core region and cladding region of the optical fiber are configured such that the viscosity ratio $R\eta$ of the core to the total becomes 2.5 or less ($R\eta \leq 2.5$).

When the viscosity ratio $R\eta$ is under such a condition, transmission loss components such as structural asymmetry loss other than the Rayleigh scattering loss can be reduced together with the Rayleigh scattering loss. Therefore, such a configuration of optical fiber can realize an optical fiber which can reliably reduce the transmission loss as a whole.

The above-mentioned optical fiber can be made by various manufacturing methods. As a specific manufacturing method thereof, a first method of making an optical fiber in accordance with the present invention comprises the steps of preparing an optical fiber preform comprising a core region and a cladding region provided at an outer periphery of the core region, in which the core average viscosity $\eta 0$ at a cross section within the core region and the total average viscosity $\eta_t$ at a total cross section combining the core region and cladding region together have a viscosity ratio $R\eta = \eta_0/\eta_t$ of 2.5 or less; and, when drawing the optical fiber preform upon heating, causing a heating furnace disposed downstream a drawing furnace to heat an optical fiber drawn by the drawing furnace such that the optical fiber attains a temperature within a predetermined temperature range.

When the optical fiber is thus annealed by use of the heating furnace disposed downstream the drawing furnace when drawing the optical fiber preform upon heating, the fictive temperature Tf within the optical fiber can be lowered as mentioned above, whereby the Rayleigh scattering loss can be reduced. Also, using an optical fiber preform satisfying the above-mentioned condition concerning the viscosity ratio $R_{72}$ reduces the transmission loss component such as structural asymmetry loss occurring in the optical fiber upon drawing or annealing at the same time, thereby making it possible to yield a manufacturing method which reliably yields an effect of reducing transmission loss as a whole.

When a resin coating section for coating the drawn optical fiber with a resin exists in the above-mentioned method of making an optical fiber, the heating furnace disposed downstream the drawing furnace is preferably provided between the drawing furnace and the resin coating section.

In not only the manufacturing method based on annealing with the heating furnace but also other manufacturing methods effective in lowering the Rayleigh scattering loss, the effect of reducing the transmission loss as a whole can reliably be obtained in a similar manner when an optical fiber or optical fiber preform with a viscosity ratio $R\eta \leq 2.5$ is used.

A second optical fiber in accordance with the present invention comprises a core region constituted by pure $SiO_2$ or $SiO_2$ doped with chlorine, and a cladding region disposed at an outer periphery of the core region, wherein the cladding region is doped with fluorine so as to yield an average relative refractive index difference $\Delta n_c$ satisfying the condition of $$\Delta n_c \geq -0.26\%$$

when the relative refractive index difference in each part is defined as being expressed in terms of % with reference to the refractive index in pure $SiO_2$; and wherein the optical fiber exhibits a Rayleigh scattering coefficient A of 0.81 dB/km·$\mu m^4$ or less, or a transmission loss $\alpha_{1.00}$ of 0.82 dB/km or less at a wavelength of 1.00 $\mu$m.

In an optical fiber (optical fiber preform) having a core made of pure $SiO_2$ (pure silica) or a core similar thereto, the viscosity of the core region becomes higher than that in the cladding region doped with F or the like. Therefore, the stress generated within the optical fiber due to the tension at the time of drawing the optical fiber preform is concentrated into the core. Here, the dependence of transmission loss upon tension in thus obtained optical fiber becomes greater, thereby causing the transmission loss to increase.

In the above-mentioned optical fiber, the core region is made of pure $SiO_2$, whereas the cladding region is configured such that the whole or part of the cladding region is doped with F (fluorine) by an amount within the range satisfying $\Delta n_c \geq -0.26\%$. By employing such a configuration, the optical fiber realizes the above-mentioned ranges of values, reduced from the reference values in the conventional optical fiber, concerning the Rayleigh scattering coefficient A or transmission loss $\alpha_{1.00}$, and transmission loss $\alpha_{1.55}$.

According to such a configuration of core and cladding regions, the upper limit of doping amount of F is given with respect to the cladding region, whereby the stress is dispersed into the cladding region. Therefore, the stress is restrained from being concentrated into the core in the optical fiber having the pure $SiO_2$ core, whereby the dependence of transmission loss upon tension in thus obtained optical fiber can be reduced. As a consequence, transmission loss components such as structural asymmetry loss other than the Rayleigh scattering loss can be reduced together with the Rayleigh scattering loss. Therefore, such a configuration of optical fiber realizes an optical fiber which can reliably reduce the transmission loss as a whole.

The reference values for Rayleigh scattering coefficient A and transmission loss $\alpha_{1.00}$ are values of about 0.85 dB/km·$\mu m^4$ and 0.86 dB/km, respectively, in an optical fiber having a pure $SiO_2$ core (or a Cl-doped $SiO_2$ core similar to the pure $SiO_2$ core) obtained with a conventional configuration by a conventional manufacturing method. By contrast, the optical fiber having the configuration in accordance with the present invention attains the above-mentioned ranges of values concerning the Rayleigh scattering coefficient A and transmission loss $\alpha_{1.00}$, each reduced by at least about 5%.

A second method of making an optical fiber in accordance with the present invention comprises the steps of preparing an optical fiber preform comprising a core region constituted by pure $SiO_2$ or $SiO_2$ doped with chlorine, and a cladding region provided at an outer periphery of the core region, wherein the cladding region is doped with fluorine so as to yield an average relative refractive index difference $\Delta n_c$ satisfying the condition of $$\Delta n_c \geq -0.26\%$$

when the relative refractive index difference in each part is defined as being expressed in terms of % with reference to the refractive index in pure $SiO_2$; and, when drawing the optical fiber preform upon heating, causing a heating furnace disposed downstream a drawing furnace to heat an optical fiber drawn out of the drawing furnace such that an optical fiber attains a temperature within a predetermined temperature range, so as to yield an optical fiber exhibiting a Rayleigh scattering coefficient A of 0.81 dB/km·$\mu m^4$ or less, or a transmission loss $\alpha_{1.00}$ of 0.82 dB/km or less at a wavelength of 1.00 $\mu$m.

When the optical fiber is thus annealed by use of the heating furnace disposed downstream the drawing furnace when drawing the optical fiber preform upon heating, the fictive temperature Tf within the optical fiber can be lowered as mentioned above, whereby the Rayleigh scattering loss can be reduced. Also, using an optical fiber preform in which the core and cladding regions have the configurations mentioned above also reduces transmission loss components such as structural asymmetry loss occurring in the optical fiber upon drawing or annealing other than the Rayleigh scattering loss, thereby making it possible to yield a manufacturing method which reliably yields an effect of reducing transmission loss as a whole.

When a resin coating section for coating the drawn optical fiber with a resin is used in the above-mentioned method of making an optical fiber, the heating furnace disposed downstream the drawing furnace is preferably provided between the drawing furnace and the resin coating section.

In not only the manufacturing method based on annealing with the heating furnace but also other manufacturing methods effective in lowering the Rayleigh scattering loss, the effect of reducing the transmission loss as a whole can reliably be obtained in a similar manner when an optical fiber or optical fiber preform configured as mentioned above is employed.

Alternatively, the method of making an optical fiber in accordance with the present invention comprises the steps of preparing an optical fiber preform comprising a core region constituted by pure $SiO_2$ or $SiO_2$ doped with chlorine, and a cladding region provided at the outer periphery of the core region, wherein the cladding region is doped with fluorine so as to yield an average relative refractive index difference $\Delta n_c$ satisfying the condition of $$\Delta n_c \geq -0.26\%$$

when the relative refractive index difference in each part is defined as being expressed in terms of % with reference to the refractive index in pure $SiO_2$; and, when drawing the optical fiber preform upon heating, drawing the optical fiber preform at a tension within the range of 0.05 to 0.20 N, so as to yield an optical fiber exhibiting a Rayleigh scattering coefficient A of 0.81 dB/km·$\mu m^4$ or less, or a transmission loss $\alpha_{1.00}$ of 0.82 dB/km or less at a wavelength of 1.00 $\mu$m.

While the optical fiber preform (optical fiber) has a configuration restraining the stress from being concentrated into the core, tension control is effected such that the tension at the time of drawing is held within a preferable tension value range of 0.05 to 0.20 N, whereby an optical fiber having reduced the transmission loss can be obtained reliably.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
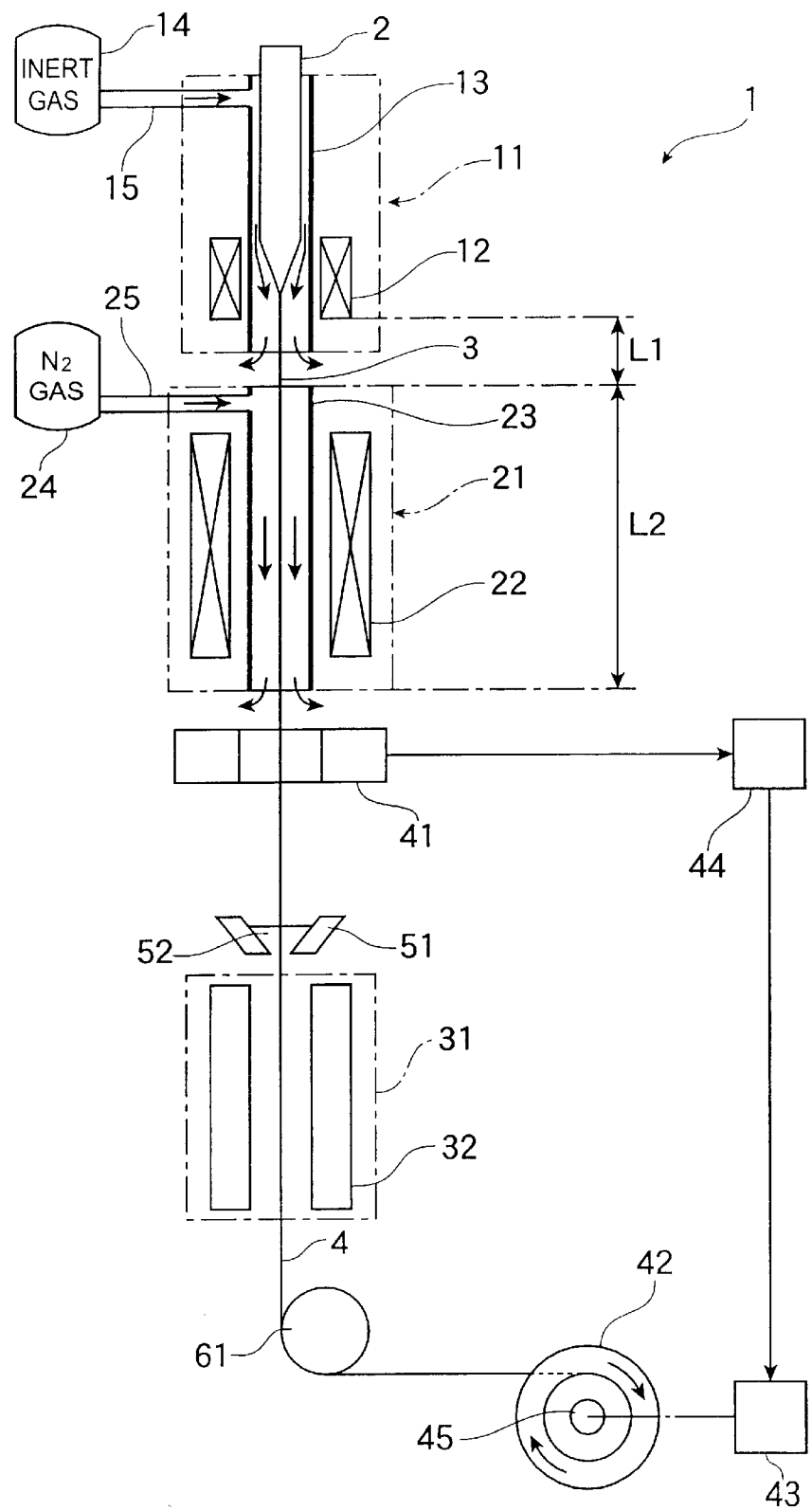
FIG. 1 is a diagram schematically showing an embodiment of a method of making an optical fiber and a drawing apparatus used in the making of the optical fiber.

In the following, preferred embodiments of the optical fiber and method of making the same in accordance with the present invention will be explained in detail with reference to the drawings. In the explanation of the drawings, constituents identical to each other will be referred to with numerals or letters identical to each other, without repeating their overlapping descriptions. Also, ratios of sizes in the drawings do not always coincide with those explained.

To begin with, the first optical fiber in accordance with the present invention and the method of making the optical fiber will be explained.

The drawing apparatus 1 shown in FIG. 1 is a drawing apparatus for drawing a silica glass type optical fiber, and has a drawing furnace 11, a heating furnace 21 for annealing, and a resin curing unit 31. The drawing furnace 11, heating furnace 21, and resin curing unit 31 are successively arranged in this order in the direction of drawing an optical fiber preform 2 (in the direction from the upper side to the lower side in FIG. 1).

First, the optical fiber preform 2 held by a preform supply apparatus (not depicted) is supplied to the drawing furnace 11, the lower end of the optical fiber preform 2 is heated by a heater 12 within the drawing furnace 11 so as to soften, and an optical fiber 3 is drawn. An inert gas supply passage 15 from an inert gas supply unit 14 is connected to a muffle tube 13 of the drawing furnace 11, whereby an inert gas atmosphere is attained within the muffle tube 13 of the drawing furnace 11.

Here, the optical fiber preform 2 supplied from the preform supply apparatus is prepared such that the viscosity of each part within the optical fiber preform 2 constituted by a core region and a cladding region disposed at the outer periphery of the core region satisfies a predetermined condition. Namely, the optical fiber preform 2 is prepared such that the viscosity ratio $R\eta=\eta_0/\eta_t$ of the core average viscosity $\eta_0$ at the cross section within the core region to the total average viscosity $\eta_t$ at the total cross section combining the core region and the cladding region together becomes 2.5 or less ($R\eta \leq 2.5$).

The heated and drawn optical fiber 3 is drastically cooled to about 1700° C. by the inert gas within the muffle tube 13. Thereafter, the optical fiber 3 is taken out of the drawing furnace 11 from the lower part of the muffle tube 13, and is cooled with air between the drawing furnace 11 and the heating furnace 21. As the inert gas, $N_2$ gas can be used, for example. The heat conduction coefficient $\lambda$ of $N_2$ gas (T=300 K) is 26 mW/(m·K). The heat conduction coefficient $\lambda$ of air (T =300 K) is 26 mW/(m·K).

Subsequently, the air-cooled optical fiber 3 is fed to the heating furnace 21 for annealing disposed downstream the drawing furcace 11, and between the drawing furnace 11 and the resin curing unit 31. Then, a predetermined segment of the optical fiber 3 is heated so as to attain a temperature a predetermined temperature range, and is annealed at a predetermined cooling rate. The heating furnace 21 has a muffle tube 23 through which the optical fiber 3 passes. Preferably, the muffle tube 23 is set so as to have a total length L2 (m) of $$L2 \geq V/8$$

in the drawing direction of the optical fiber preform 2 (the vertical direction in FIG. 1). Here, V is the drawing rate (m/s).

Preferably, the muffle tube 23 in the heating furnace 21 is set at a position where the temperature of the optical fiber 3 immediately before it enters the muffle tube 23 (entering temperature) falls within the range of 1400° C. to 1800° C., and $$L1 \leq 0.2 \times V$$

is satisfied with respect to the drawing furnace 11. Here, L1 is the distance (m) from the lower end of the heater 12 of the drawing furnace 11 to the upper end of the muffle tube 23, whereas V is the drawing rate (m/s). The temperature of the heater 22 in the heating furnace 21 is set such that the furnace center (part through which the optical fiber 3 passes) attains a temperature within the range of 1100° C. to 1600° C., preferably 1200° C. to 1600° C., 1250° C. to 1500° C. in particular, more preferably 1300° C. to 1500° C.

According to the above-mentioned settings of position and length of the heating furnace 21 (muffle tube 23), the heated and drawn optical fiber 3 is heated in the heating furnace 21 for annealing so as to attain a temperature within the range of 1100° C. to 1700° C., preferably 1200° C. to 1700° C. In particular, of the part attaining a temperature of 1100° C. to 1700° C. in the optical fiber 3, a segment where the optical fiber 3 yields a temperature difference of 50° C. or greater, e.g., a part where the temperature of the optical fiber 3 ranges from 1250° C. to 1500° C., more preferably from 1300° C. to 1500° C. (segment yielding a temperature difference of 200° C.), is annealed at a cooling rate of 1000° C./second or less.

When the furnace center is set to a temperature within the range of 1100° C. to 1600° C., preferably 1200° C. to 1600° C., a segment attaining a temperature difference of 50° C. or greater in the part of heated and drawn optical fiber 3 yielding a temperature of 1100° C. to 1700° C., preferably 1200° C. to 1700° C., is annealed at a cooling rate of 1000° C./second or less.

An $N_2$ gas supply passage 25 from an $N_2$ gas supply unit 24 is connected to the muffle tube 23 of the heating furnace 21, whereby an $N_2$ gas atmosphere is attained within the muffle tube 23 of the heating furnace 21. A gas having a relatively large molecular weight such as air or Ar and the like can also be used in place of $N_2$ gas. When a carbon heater is used, however, it is necessary to use an inert gas.

The outer diameter of the optical fiber 3 let out of the heating furnace 21 is measured online by an outer-diameter meter 41 acting as outer-diameter measuring means, and thus measured value is fed back to a driving motor 43 for driving a drum 42 to rotate, whereby the outer diameter is controlled so as to become constant. The output signal from the outer-diameter meter 41 is fed to a control unit 44 acting as control means, where the rotating speed of the drum 42 (driving motor 43) is determined by an arithmetic operation such that the outer diameter of the optical fiber 3 attains a predetermined value which has been set beforehand.

An output signal indicative of the rotating speed of the drum 42 (driving motor 43) determined by the arithmetic operation is outputted from the control unit 44 to a driving motor driver (not depicted), whereby the driving motor driver controls the rotational speed of the driving motor 43 according to the output signal from the control unit 44.

Thereafter, the optical fiber 3 is coated with a UV resin 52 by a coating die 51. The coated UV resin 52 is cured by a UV lamp 32 in the resin curing unit 31, whereby a coated optical fiber 4 is formed. Subsequently, by way of a guide roller 61, the coated optical fiber 4 is taken up by the drum 42. The drum 42 is supported by a rotary driving shaft 45, an end part of which is connected to the driving motor 43.

In this embodiment, the coating die 51 and the resin curing unit 31 constitute a resin coating section for coating the optical fiber with a resin. Without being restricted to the configuration mentioned above, the resin coating section may be configured such that the optical fiber is coated with a heat-curable resin, which is then cured by the heating furnace.

As mentioned above, the inert gas supply passage 15 from the inert gas supply unit 14 is connected to the muffle tube 13 of the drawing furnace 11, whereby an inert gas atmosphere is attained within the muffle tube 13 of the drawing furnace 11. However, an $N_2$ gas supply unit may be provided as the inert gas supply unit 14, so as to supply $N_2$ gas into the muffle tube 13 and attain an $N_2$ gas atmosphere.

In the case where the drawing rate is slow, e.g., 100 m/min, the optical fiber 3 may be cooled to about 1000° C. within the drawing furnace 11 (muffle tube 13) in an He gas atmosphere. In this case, it is preferred that an $N_2$ gas atmosphere be provided within the muffle tube 13 so that the optical fiber 3 attains a temperature of about 1700° C. at the exit of the drawing furnace 11 (muffle tube 13). Also, an He gas supply unit and an $N_2$ gas supply unit may be provided, so as to supply He gas or $N_2$ gas into the muffle tube 13 according to the drawing rate. In practice, structural relaxation is possible by reheating to 1100° C. to 1700° C., preferably 1200° C. to 1700° C., after cooling. In this case, however, a long heater is required to reheat the cooled optical fiber.

The above-mentioned method of making an optical fiber is a method capable of reducing the Rayleigh scattering loss causing the transmission loss of light in the optical fiber by lowering the fictive temperature Tf within the optical fiber upon annealing by use of the heating furnace 21. Further, in this embodiment, the optical fiber preform to which this method is applied (or the optical fiber obtained from this optical fiber preform) is configured such that the viscosity ratio $R\eta = \eta_0/\eta_t$ of the core average viscosity $\eta_0$ to the total average viscosity $\eta_t$ is set to 2.5 or less ($R\eta \leq 2.5$) as mentioned above.

When a manufacturing method capable of reducing the Rayleigh scattering loss such as the manufacturing method having a cooling process shown in FIG. 1 is applied to an optical fiber and optical fiber preform having a configuration satisfying such a viscosity ratio condition, the transmission loss caused by the Rayleigh scattering loss and the like can reliably be reduced as a whole.

Namely, the Rayleigh scattering loss with respect to light transmitted through the optical fiber is fully reduced (by at least 5%) so as to become 95% or less of a predetermined reference value indicating the Rayleigh scattering loss in a conventional optical fiber, and the generation and increase of transmission loss components such as the structural asymmetry loss other than the Rayleigh scattering loss are suppressed at the same time, whereby an optical fiber having a very low transmission loss as a whole can be obtained.

The transmission loss reducing effect obtained by employing the core average viscosity $\eta_0$, the total average viscosity $\eta_t$, the viscosity ratio $R\eta = \eta_0/\eta_t$, and the above-mentioned condition of viscosity ratio $R\eta \leq 2.5$ will now be explained specifically.

Figure 2:
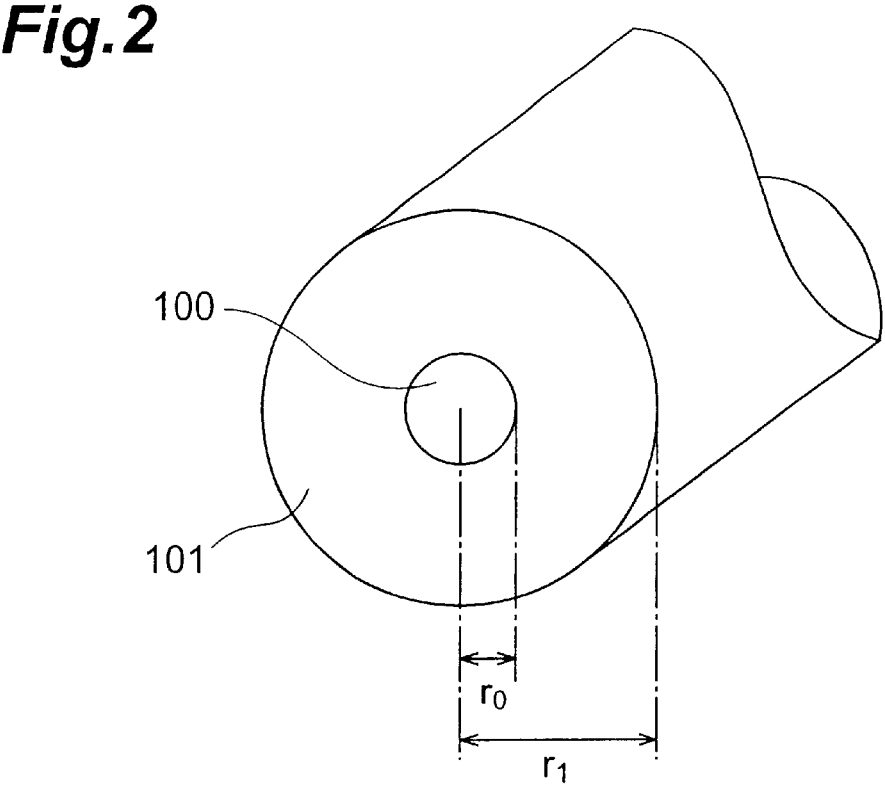
FIG. 2 is a view for explaining the viscosity ratio $R\eta$ in the first optical fiber.

First, definitions of the core average viscosity $\eta_0$, the total average viscosity $\eta_t$, and the viscosity ratio $R\eta$, and the like will be explained. Here, as shown in FIG. 2, an optical fiber (or an optical fiber preform) constituted by two layers, i.e., a core region 100 and a cladding region 101 provided at the outer periphery thereof, will be considered. Also, let $r_0$ be the radius of the outer periphery of the core region 100, $r_1$ be the radius of the outer periphery of the cladding region 101, and $\eta$ be the viscosity coefficient indicative of the viscosity at each position of the cross section.

Here, the core average viscosity $\eta_0$ averaging the viscosity coefficient $\eta$ in the cross section within the core region 100 is determined by the following expression:

$$\eta_0 = \int_0 \eta dS \Big/ \int_0 dS$$
$$= \int_0 \eta dS / \pi r_0^2$$

where $\int_0 \eta dS$ is the integral of the viscosity coefficient $\eta$ with respect to each position within the cross section in the range of the cross section of the core region 100 shown in FIG. 2, and $\int_0 dS$ corresponds to the cross-sectional area $\pi r_0^2$ of the core region 100 as shown in the expression.

Similarly, the total average viscosity $\eta_t$ averaging the viscosity coefficient $\eta$ with respect to the total cross section combining the core region 100 and the cladding region 101 together is determined by the following expression:

$$\eta_t = \int_t \eta dS \Big/ \int_t dS$$
$$= \int_t \eta dS / \pi r_1^2$$

where $\int_1 \eta dS$ is the integral of the viscosity coefficient $\eta$ with respect to each position within the cross section in the total range of the cross section of the core region 100 and cladding region 101 shown in FIG. 2, and $\int_1 dS$ corresponds to the cross-sectional area $\pi r_1^2$ combining the core region 100 and cladding region 101 together as shown in the expression.

From the core average viscosity $\eta_0$ and total average viscosity $\eta_t$ determined as in the foregoing, the viscosity ratio $R\eta$ is determined as $R\eta = \eta_0/\eta_t$.

In the case where the cladding region is constituted by a plurality of cladding layers having respective refractive indices different from each other, it will be sufficient if the above-mentioned expression (e.g., the integral expression of viscosity coefficient η) is employed while these plurality of cladding layers in total are taken as a cladding region. Preferably, the viscosity coefficient at the time of softening is used for the viscosity coefficient η at each position within the optical fiber. Specifically, the viscosity coefficient at a temperature within the range of 1300° C. to 1900° C., e.g., at 1900° C. can be used.

The transmission loss reducing effect obtained by employing the condition concerning the viscosity ratio Rη≦2.5 will now be explained.

As for the viscosity of the core region 100 and cladding region 101, in an optical fiber having a pure $SiO_2$ (silica) core and the like, the viscosity $\eta_0$ of the core region 100 becomes higher than that of the cladding region 101. If the viscosity $\eta_0$ is so high that the viscosity ratio Rη has a large value as such, the tension and stress applied to the optical fiber during or after drawing and the like will be concentrated into the core region 100.

Namely, when an additive such as Ge, Cl, or F which modifies the refractive index is added to $SiO_2$ glass (silica glass), the viscosity coefficient η at each position within the optical fiber changes so as to lower its viscosity. Specifically, the viscosity coefficient η changes according to the following expression:

$$\log_{10}\eta = 5.6 + 1.58[F] - 0.57[Ge, Cl]$$

(see "K. Shiraki et al., *Electronics Letters*, Vol. 29, No. 14, pp. 1263–1264 (1993)").

Here, [F] indicates the amount of addition of F (fluorine) expressed by the value of relative refractive index difference (%) with respect to pure $SiO_2$, whereas [Ge, Cl] indicates the amount of addition of Ge (germanium) or Cl (chlorine) similarly expressed by the value of relative refractive index difference (%) with respect to pure $SiO_2$. Here, it is presumed that the influence of Cl on the viscosity coefficient η is on a par with that of Ge.

In view of the refractive index changes occurring when the individual additives are added to $SiO_2$ glass, the polarities of their amounts of addition expressed in terms of relative refractive index difference are [F]<0, and [Ge, Cl]>0. Namely, as seen from the above expression, the viscosity coefficient η becomes smaller when Ge, Cl, F, or the like is added to $SiO_2$. Therefore, in an optical fiber having a pure $SiO_2$ core or a core doped with a small amount of additives, the viscosity of the cladding region 101 is lowered by the addition of F and the like, whereby the viscosity $\eta_0$ in the core region 100 and the viscosity ratio Rη become greater values.

If the viscosity ratio Rη is large as such, a sufficient transmission loss reducing effect cannot be obtained even when the optical fiber is made by a manufacturing method having a Rayleigh scattering loss reducing effect such as the manufacturing method shown in FIG. 1 carrying out annealing by use of a heating furnace after drawing or the like.

This is assumed to be mainly because of the fact that, while the Rayleigh scattering loss is reduced by the decrease in fictive temperature Tf within the optical fiber and the like, the above-mentioned concentration of stress into the core region 100 enhances other transmission loss components such as structural asymmetry loss, whereby the transmission loss as a whole is not fully reduced or increases. Also, there is a possibility that the effect of reducing the Rayleigh scattering loss is not fully obtained due to the stress concentration and the like.

When the optical fiber or optical fiber preform is configured so as to satisfy the viscosity ratio condition of Rη≦2.5, by contrast, the Rayleigh scattering loss in the resulting optical fiber is reliably reduced by at least 5% from a reference value, so as to yield a value which is 95% or less of the reference value. At the same time, transmission loss components such as structural asymmetry loss other than the Rayleigh scattering loss can be restrained from occurring and increasing. In view of the foregoing, the transmission loss as a whole can reliably be reduced.

In the case where the viscosity ratio Rη is small, no lower limit value is necessary from the viewpoint of the concentration of stress into the core. When the amount of addition of Ge or the like is too large within the core, by contrast, the optical fiber becomes inappropriate due to the increase in transmission loss caused by additives, and the like. Therefore, it is preferred that Rη≧0.07.

As an index for evaluating the effect of reducing the Rayleigh scattering loss, a Rayleigh scattering coefficient A can be used. In general, the transmission loss $\alpha_\lambda$ (dB/km) of the optical fiber at a wavelength λ is represented by the following expression:

$$\alpha_\lambda = A/\lambda^4 + B + C(\lambda)$$

according to the Rayleigh scattering loss and other transmission loss components such as structural asymmetry loss. In this expression, the first term, $A/\lambda^4$ (dB/km), indicates the Rayleigh scattering loss, and its coefficient A is the Rayleigh scattering coefficient (dB/km·$\mu$m$^4$). It can be seen from the above-mentioned expression that the Rayleigh scattering loss is in proportion to the Rayleigh scattering coefficient A, whereby the Rayleigh scattering loss decreases by 5% if the Rayleigh scattering coefficient A is reduced by 5% from the reference value.

Here, in an optical fiber obtained by a conventional manufacturing method other than the manufacturing method reducing the Rayleigh scattering loss by annealing, the value of Rayleigh scattering coefficient A (dB/km·$\mu$m$^4$) is represented by the following expression:

$$A_0 = 0.85 + 0.29[Ge]$$

where [Ge] is the amount of addition of Ge to the core region 100 expressed by the value of relative refractive index difference (%) with respect to pure $SiO_2$. Therefore, this normal value $A_0$ can be taken as a reference value of the Rayleigh scattering coefficient A. Here, it will be sufficient if the Rayleigh scattering coefficient A in thus obtained optical fiber is reduced by at least 5% from the reference value $A_0$.

For evaluating the total transmission loss including the Rayleigh scattering loss, the transmission loss $\alpha_{1.00}$ at a wavelength of 1.00 $\mu$m may be taken as an index. At a wavelength of 1.00 $\mu$m, B+C(λ) in the above-mentioned expression of $\alpha_\lambda$ is substantially 0.01, whereby the value of transmission loss $\alpha_{1.00}$ (dB/km) in the optical fiber obtained by a conventional manufacturing method becomes:

$$\alpha_0 = A_0 + 0.01$$

$$= 0.86 + 0.29[Ge]$$

Therefore, this normal value $\alpha_0$ can be taken as a reference value of the transmission loss $\alpha_{1.00}$. Here, it is preferred that the transmission loss $\alpha_{1.00}$ in thus obtained optical fiber be reduced by at least 5% from the reference value $\alpha_0$.

Thus, when the Rayleigh scattering coefficient A or the transmission loss $\alpha_{1.00}$ at a wavelength of 1.00 μm is used as an index, the effect of reducing the Rayleigh scattering loss or the total transmission loss including the structural asymmetry loss and the like can reliably be obtained. Each of the expressions for reference values includes the amount of addition of Ge [Ge]. Therefore, transmission loss can be evaluated in response to the amount of Ge added to the core.

In view of the above expression, the Rayleigh scattering coefficient A can be determined from data concerning the dependence of transmission loss (e.g., the gradient in a $1/\lambda^4$ plot) upon wavelength. Also, the transmission loss $\alpha_{1.00}$ at a wavelength of 1.00 μm is used as an index for evaluating the transmission loss as a whole because of the fact that the value of transmission loss at a wavelength of 1.00 μm is greater than that in the 1.55-μm band used for optical transmission or the like and can be evaluated with a sufficient accuracy in a relatively short optical fiber sample having a length of about 1 to 10 km.

In the optical fiber of the present invention, the transmission loss $\alpha_{1.00}$ at a wavelength of 1.00 μm and the transmission loss $\alpha_{1.55}$ at a wavelength of 1.55 μm correspond to each other with a predetermined relationship therebetween. Therefore, if the reducing effect is evaluated by the transmission loss $\alpha_{1.00}$, then the reduction can similarly be seen concerning the transmission $\alpha_{1.55}$. As a specific corresponding relationship, while the transmission loss $\alpha_{1.00}$ at a wavelength of 1.00 μm is expressed by $$\alpha_{1.00} = A + 0.01$$

as mentioned above, the transmission $\alpha_{1.55}$ at a wavelength of 1.55 μm corresponding to this expression is expressed by the following expression:

$$\alpha_{1.55} = A \times 0.17325 + 0.025$$

In the above-mentioned optical fiber and method of making the same, the viscosity ratio $R\eta$ given by the core average viscosity $\eta_0$ and the total average viscosity $\eta_t$ is under the condition of $R\eta \leq 2.5$. The viscosity ratio $R\eta$ is closely related to the tension applied to the core region in the optical fiber at the time of drawing or the tension component in the residual stress after drawing. Therefore, the viscosity ratio $R\eta$ can also be evaluated by these kinds of stress or tension.

The residual stress in the optical fiber after drawing is constituted by the tension component caused by the tension at the time of drawing and the thermal expansion component caused by thermal expansion. Here, letting σz be the tension component of the residual stress in the optical axis direction, the tension component σz is expressed by the following expression:

$$\sigma z = f \times \eta_0 / \int_t \eta \, dS$$

where f indicates the tension at the time of drawing.

On the other hand, from the above-mentioned expressions concerning viscosity, the viscosity ratio $R\eta$ is:

$$R\eta = \eta_0 / \left( \int_t \eta \, dS \bigg/ \int_t dS \right)$$

$$= \eta_0 / \left( \int_t \eta \, dS / \pi r_1^2 \right)$$

where $r_1$ is the radius of the outer periphery of the cladding region 101 as shown in FIG. 2. From these expressions, the viscosity ratio $R\eta$ is represented with the tension component σz by the following expression:

$$R\eta = \sigma z / \left( f \bigg/ \int_t dS \right)$$

$$= \sigma z / (f / \pi r_1^2)$$

Here, as a typical condition, letting the tension f=0.1 N (10 gw), and $r_1$=62.5 μm (optical fiber diameter of 125 μm), a viscosity ratio of $R\eta$=2.5 substantially corresponds to a tension component of σz=20 MPa. Therefore, in order to satisfy the viscosity ratio condition of $R\eta \leq 2.5$, it is preferred that the tension component σz of the residual stress in the optical axis direction be 20 MPa or less (σz≦20 MPa). In view of the total residual stress additionally including the thermal expansion component, since the thermal expansion component is substantially on the order of 10 MPa, it is preferred that the residual stress be 30 MPa or less.

For measuring the residual stress distribution within the optical fiber, a method using photoelastic computer tomography and the like have been known (see "T. Abe et al., J. Opt. Soc. Am. A, Vol. 3, No. 1, pp. 133–138 (1986)"), for example.

For the transmission loss reducing effect obtained by the first optical fiber of the present invention and the method of making the same, specific examples and a comparative example will be shown. Each of the optical fibers in the following examples and comparative example was made by the manufacturing method using the annealing in the heating furnace shown in FIG. 1 and a conventional manufacturing method without annealing, so as to verify its transmission loss reducing effect. The heating condition in the heating furnace for annealing was set to a transit time of 3 seconds at 1350° C.

Figure 3:
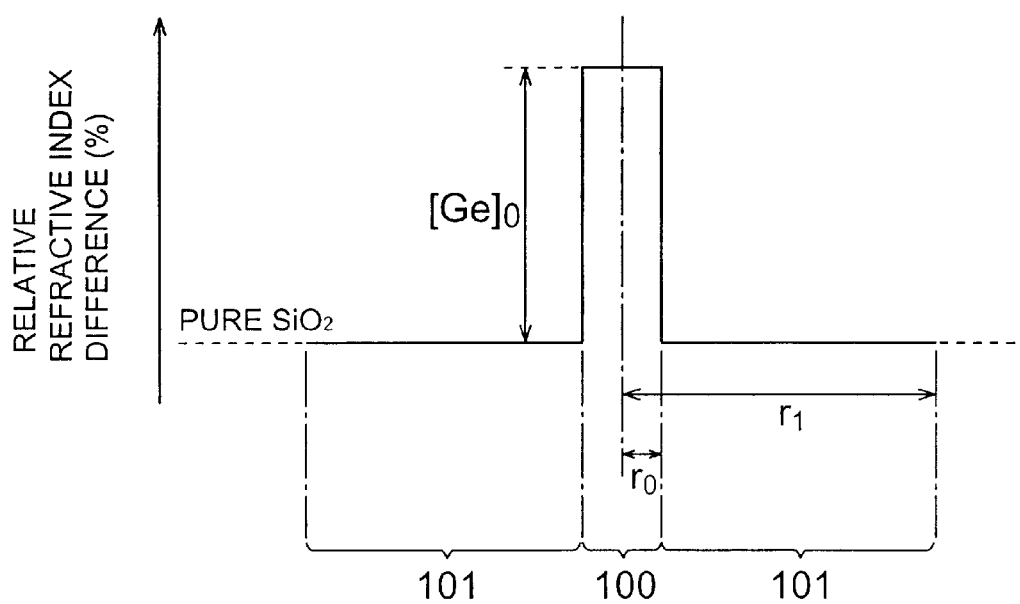
FIG. 3 is a chart showing the refractive index profile in a first example of the first optical fiber.

FIG. 3 is a chart showing the refractive index profile of the first example of the optical fiber. The optical fiber of this example is constituted by a core region 100 including the center axis and a cladding region 101 at the outer periphery thereof as in FIG. 2. The respective radii $r_0$ and $r_1$ of the individual regions were set such that $2r_0$=10 μm and $2r_1$=125 μm.

Also, while the cladding region 101 was made of pure $SiO_2$, Ge was added to the core region 100 such that the amount of addition became $[Ge]_0$=+0.35% in terms of the relative refractive index difference (%) with respect to pure $SiO_2$.

Figure 4:
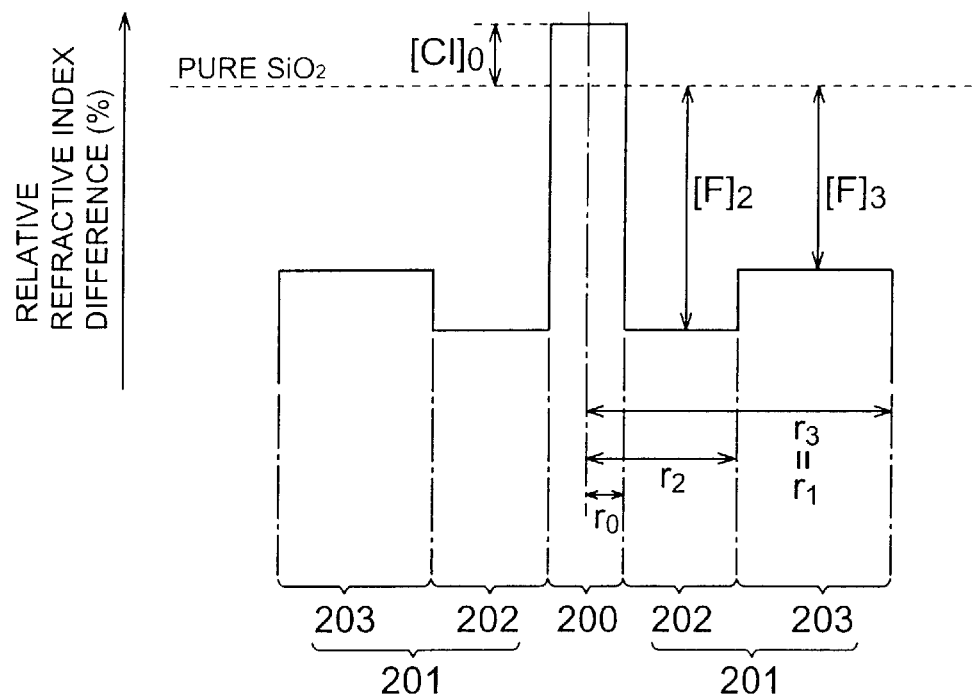
FIG. 4 is a chart showing the refractive index profile in a second example of the first optical fiber.

FIG. 4 is a chart showing the refractive index profile of the second example of the optical fiber. The optical fiber of this example is constituted by a core region 200 including the center axis and two cladding regions 202, 203 at the outer periphery thereof, whereas the cladding regions 202, 203 form a total cladding region 201. The respective radii $r_0$, $r_2$, and $r_3$ (=$r_1$) of the individual regions were set such that $2r_0$=10 μm, $2r_2$=55 μm, and $2r_3$ (=$2r_1$)=125 μm.

Also, Cl was added to the core region 200 such that the amount of addition became $[Cl]_0$=+0.08% in terms of the relative refractive index difference (%) with respect to pure $SiO_2$. On the other hand, F was added to the two cladding regions 202, 203 such that the respective amounts of addition became $[F]_2$=−0.28% and $[F]_3$=−0.20% in terms of the relative refractive index difference (%) with respect to pure $SiO_2$.

Further, as the third example of the optical fiber, an optical fiber having a configuration similar to that of the second example was made while the heating condition in the heating furnace for annealing was set to a transit time of 3 seconds at 1100° C.

Figure 5:
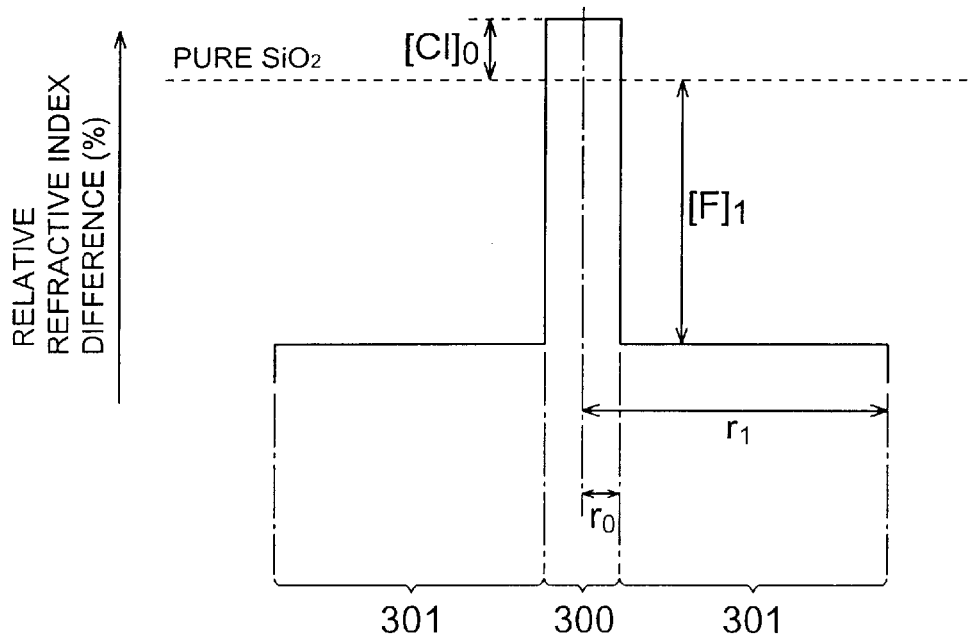
FIG. 5 is a chart showing the refractive index profile in a comparative example of the optical fiber.

FIG. 5 is a chart showing the refractive index profile of the comparative example of the optical fiber. The optical fiber of the comparative example is constituted by a core region 300 including the center axis and a cladding region 301 at the outer periphery thereof. The respective radii $r_0$ and $r_1$ of the individual regions were set such that $2r_0=10\,\mu m$ and $2r_1=125\,\mu m$.

Also, Cl was added to the core region 300 such that the amount of addition became $[Cl]_0=+0.08\%$ in terms of the relative refractive index difference (%) with respect to pure $SiO_2$. On the other hand, F was added to the cladding region 301 such that the amount of addition became $[F]_1=-0.35\%$ in terms of the relative refractive index difference (%).

Table 1 shows the results of determination of viscosity ratio $R\eta$, transmission loss $\alpha_{1.55}$ (dB/km), $\alpha_{1.00}$ (dB/km), and Rayleigh scattering coefficient A (dB/km·$\mu m^4$) concerning the foregoing first, second, and third examples and comparative example.

at least 5%, so that it becomes 95% or less of a normal reference value, and preventing transmission loss components such as the structural asymmetry loss other than the Rayleigh scattering loss from occurring and increasing; and a method of making the same.

A second optical fiber in accordance with the present invention and a method of making the same will now be explained.

Here, in the following, the relative refractive index difference indicating the value of refractive index in each part is defined as the relative refractive index difference, expressed in terms of %, from the refractive index of pure $SiO_2$ (pure silica) taken as a reference (relative refractive index difference=0). The respective average relative refractive index differences in the individual regions and layers are defined by average values obtained after weighting the relative refractive index differences within the regions (within the layers) according to their areas.

TABLE 1

|  | Viscosity | No Annealing | | | Annealed | | |
| --- | --- | --- | --- | --- | --- | --- | --- |
|  | Ratio $R\eta$ | $\alpha_{1.55}$ | A | $\alpha_{1.00}$ | $\alpha_{1.55}$ | A | $\alpha_{1.00}$ |
| Example 1 | 0.63 | 0.190 | 0.95 | 0.96 | 0.180 | 0.89 | 0.90 |
| Example 2 | 1.90 | 0.170 | 0.85 | 0.86 | 0.161 | 0.80–0.79 | 0.81–0.80 |
| Example 3 | 1.90 | 0.170 | 0.85 | 0.86 | 0.164 | 0.81 | 0.82 |
| Comparative Example | 3.20 | 0.170 | 0.85 | 0.86 | 0.170 | 0.80–0.79 | 0.82–0.81 |

(unit: $\alpha_{1.00}$, $\alpha_{1.55}$ = dB/km; A = dB/km · $\mu m^4$)

According to these results, the respective optical fibers of the examples yielded values of viscosity ratio $R\eta$ of 0.63 and 1.90, thus satisfying the condition of $R\eta \leq 2.5$. By contrast, the value of viscosity ratio $R\eta$ in the comparative example was 3.20, thus exceeding 2.5.

Figure 6:
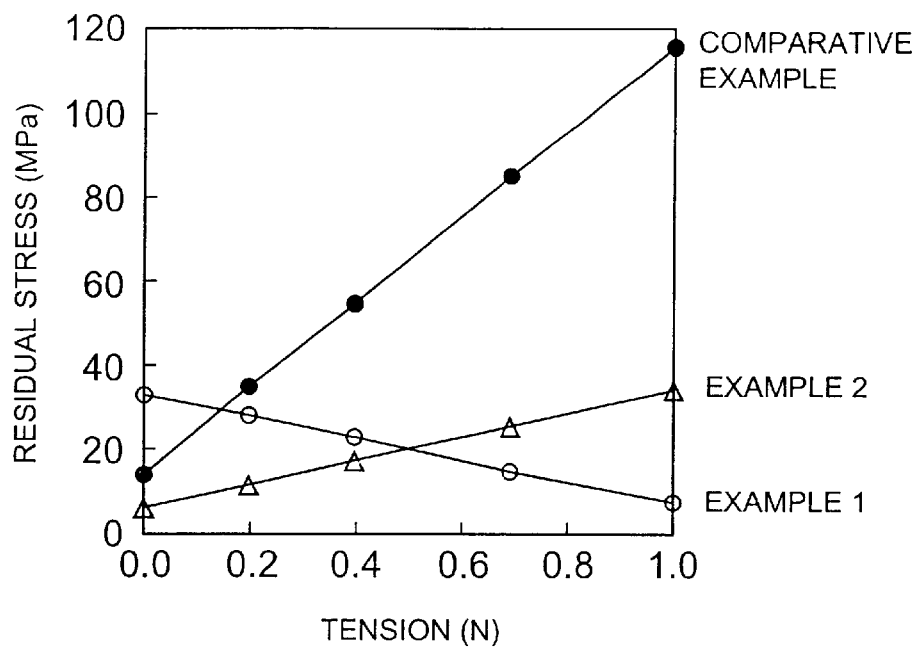
FIG. 6 is a graph showing the correlation between tension and residual stress in optical fibers.

Referring to the graph of residual stress shown in FIG. 6 concerning the first and second examples and the comparative example, each example exhibits a relatively small residual stress. In the comparative example yielding a relatively large viscosity ratio $R\eta$ of 3.20, by contrast, a very large residual stress is seen to occur as the tension increases.

When the transmission loss $\alpha_{1.55}$, Rayleigh scattering coefficient A, and transmission loss $\alpha_{1.00}$ obtained in the case where annealing is carried out in the heating furnace after drawing are compared with those in the case without annealing in each of the optical fibers having such viscosity ratio values, it is seen that the first, second, and third examples satisfying the condition of viscosity ratio $R\eta \leq 2.5$ yield sufficiently better effects of reducing the Rayleigh scattering coefficient A and transmission losses $\alpha_{1.55}$, $\alpha_{1.00}$ in the case with annealing than in the case without annealing.

In the comparative example whose viscosity ratio $R\eta>2.5$, by contrast, it is seen that, while an effect of reducing the Rayleigh scattering coefficient A is obtained in the case with annealing as in the examples, effects of reducing the total transmission losses $\alpha_{1.55}$, $\alpha_{1.00}$ are not fully obtained due to the increase in structural asymmetry loss caused by a greater viscosity ratio and the like.

In view of the foregoing, while using a manufacturing method having an effect of reducing the Rayleigh scattering loss such as a manufacturing method by use of annealing, the viscosity ratio of the optical fiber or optical fiber preform is under the condition of $R\eta \leq 2.5$, thus realizing an optical fiber which can reliably reduce the transmission loss as a whole by securely reducing the Rayleigh scattering loss by First, the method of making an optical fiber will be explained. The method of making the second optical fiber in accordance with the present invention is substantially the same as the first manufacturing method mentioned above. As the drawing apparatus for making the optical fiber, the drawing apparatus configured as shown in FIG. 1 is used.

However, the optical fiber preform 2 supplied from a preform supply apparatus is prepared so as to satisfy a predetermined condition concerning the configuration thereof constituted by a core region and a cladding region disposed at the outer periphery of the core region. Namely, the optical fiber preform 2 is prepared such that the core region is made of a pure $SiO_2$ core or a Cl (chlorine) doped $SiO_2$ core which can be handled similarly to pure $SiO_2$, whereas the cladding region is doped with F (fluorine) such that its average relative refractive index difference $\Delta n_c$ satisfies the condition of $$\Delta n_c \geq -0.26\%.$$

The above-mentioned method of making an optical fiber is a manufacturing method which can reduce the Rayleigh scattering loss, which may cause transmission loss of light in the optical fiber, by lowering the fictive temperature Tf within the optical fiber upon annealing by use of the heating furnace 21. Further, as mentioned above, the optical fiber preform to which this manufacturing method is applied (or the optical fiber obtained from this optical fiber preform) is configured such that the core region is made of pure $SiO_2$ or Cl-doped $SiO_2$, whereas the cladding region is doped with F such that its average relative refractive index difference $\Delta n_c$ satisfies the condition of $\Delta n_c \geq -0.26\%$ in this embodiment.

When a manufacturing method capable of reducing the Rayleigh scattering loss such as the manufacturing method shown in FIG. 1 having an annealing process is applied to the optical fiber and optical fiber preform having a configuration satisfying such a condition, the transmission loss caused by the Rayleigh scattering loss and the like can securely be reduced as a whole.

Even when a manufacturing method having an effect of reducing the Rayleigh scattering loss is employed as such, the total transmission loss is not always reduced. This is presumed to be because of the fact that, while the Rayleigh scattering loss is reduced, other transmission loss components such as the structural asymmetry loss increase due to excessive stress concentration into the core, whereby the effect of reducing the transmission loss cannot be obtained as a whole. When the structural asymmetry loss and the like are to be restrained from occurring, on the other hand, the effect of reducing the Rayleigh scattering loss cannot fully be obtained.

In general, as for the tension applied to the optical fiber when drawing the optical fiber preform 2 upon heating, a lower tension reduces the Rayleigh scattering loss but increases the structural asymmetry loss. At a higher tension, by contrast, the Rayleigh scattering loss increases due to the influence over the binding of $SiO_2$ and the like.

When the optical fiber preform and optical fiber configured as mentioned above are employed, by contrast, an upper limit for favorably dispersing the stress into the cladding region is given with respect to the amount of addition of F to the cladding region, whereby the stress concentration into the pure $SiO_2$ core in the optical fiber having this core can be suppressed, so as to reduce the dependence of transmission loss upon tension in the resulting optical fiber. As a consequence, not only the Rayleigh scattering loss but also transmission loss components such as the structural asymmetry loss other than the Rayleigh scattering loss can be reduced at the same time. Therefore, such a configuration of the optical fiber makes it possible to realize an optical fiber which can reliably reduce the transmission loss as a whole.

Specifically, the Rayleigh scattering coefficient A can fall within the range not higher than 0.81 dB/km·$\mu m^4$, which is lower by at least about 5% than a reference value of 0.85 dB/km·$\mu m^4$ in the optical fiber having a conventional pure $SiO_2$ core (or a Cl-doped $SiO_2$ core similar to the pure $SiO_2$ core). Also, the transmission loss $\alpha_{1.00}$ at a wavelength of 1.00 $\mu m$ can fall within the range not higher than 0.82 dB/km, which is lower by at least about 5% than a similar reference value of 0.86 dB/km.

As for the tension at the time of drawing in the drawing furnace 11 in the above-mentioned method of making the optical fiber, it is preferred that the tension be controlled so as to fall within a permissible preferred tension value range in order to suppress the increase in transmission loss and the like caused by excessive changes in tension. In a preferred tension value range, the tension is from 0.05 to 0.20 N (5 to 20 gw).

Figure 7:
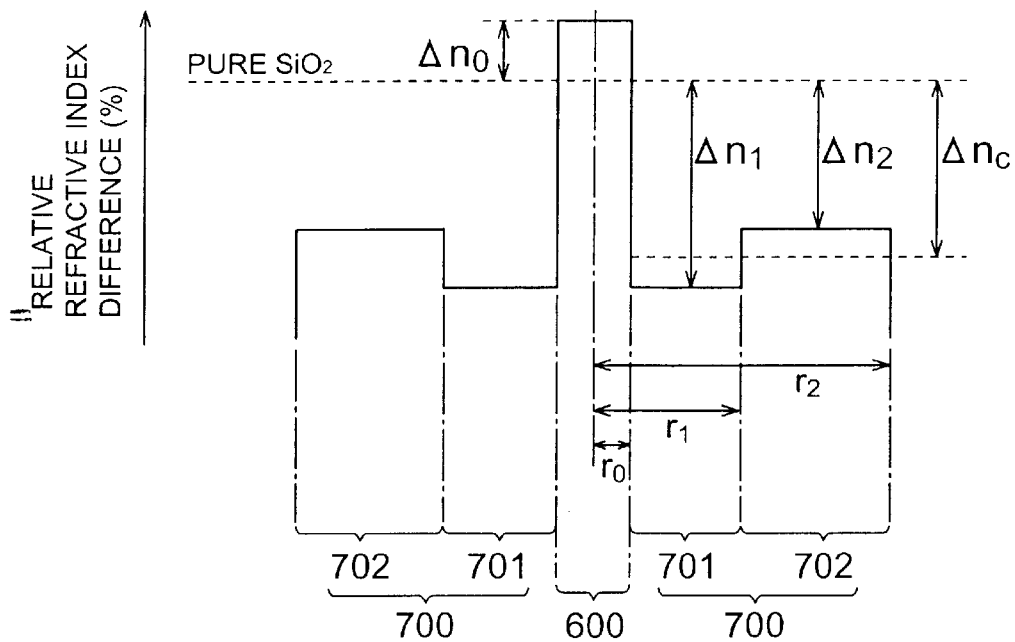
FIG. 7 is a chart showing the refractive index profile in a first embodiment of the second optical fiber.

The configuration of the optical fiber will now be explained. FIG. 7 is a chart showing the refractive index profile of a first embodiment of the second optical fiber in accordance with the present invention.

This optical fiber is an optical fiber of $SiO_2$ glass (silica glass) type; and comprises a core region 600 including the center axis of the optical fiber, and a cladding region 700 provided at the outer periphery of the core region 600.

The core region 600 is formed such that the outer periphery thereof has a radius of $r_0$. In the core region 600, pure $SiO_2$ glass is doped with a predetermined amount of Cl (chlorine) as an additive for enhancing the refractive index. Consequently, the average relative refractive index difference within the core region 600 is $\Delta n_0$ (where $\Delta n_0 > 0$).

On the other hand, the cladding region 700 in this embodiment comprises two layers of cladding, i.e., an inner cladding layer 701 provided at the outer periphery of the core region 600 and an outer cladding layer 702 further provided at the outer periphery of the inner cladding layer 701.

The inner cladding layer 701 is formed such that the outer periphery thereof has a radius of $r_1$. In the inner cladding layer 701, pure $SiO_2$ glass is doped with a predetermined amount of F (fluorine) as an additive for lowering the refractive index. Consequently, the average relative refractive index difference within the inner cladding layer 701 is $\Delta n_1$ (where $\Delta n_1 < 0$).

The outer cladding layer 702 is formed such that the outer periphery thereof has a radius of $r_2$. In the outer cladding layer 702, pure $SiO_2$ glass is doped with a predetermined amount of F (fluorine). Consequently, the average relative refractive index difference within the outer cladding layer 702 is $\Delta n_2$ (where $\Delta n_2 < 0$). Here, the average amount of addition of F in the outer cladding layer 702 is smaller than that of F in the inner cladding layer 701, whereby the average relative refractive index differences of the cladding regions 701 and 702 have a relationship of $0 > \Delta n_2 > \Delta n_1$.

Also, in the cladding region 700 combining the inner cladding layer 701 having the average relative refractive index difference $\Delta n_1$ and the outer cladding layer 702 having the average relative refractive index difference $\Delta n_2$ together, its total average relative refractive index difference $\Delta n_c$ is a value satisfying the above-mentioned condition of $\Delta n_c \geq -0.26\%$ (where $0 > \Delta n_2 > \Delta n_{c > \Delta n1}$).

The core region 600 of this optical fiber is made of a Cl-doped $SiO_2$ core. Though slightly lowered by the addition of Cl, the viscosity of the core region 600 is higher than that of the cladding region 700 due to the doping amount and the like. On the other hand, the amount of F added to the cladding region 700 is set to an amount not higher than the upper limit of the amount at which $\Delta n_c = -0.26\%$ (corresponding to the condition of $\Delta n_c \geq -0.26\%$) whereby the stress applied to the inside of the optical fiber is favorably dispersed into the cladding region 700, so as to suppress the stress concentration into the core.

Since the stress is thus restrained from being concentrated into the core, the dependence of transmission loss upon the tension applied to the optical fiber at the time of drawing is reduced, which realizes an optical fiber whose transmission loss is fully reduced as a whole.

Also, the optical fiber in accordance with this embodiment has two layers of cladding, i.e., the inner cladding layer 701 with a greater amount of F added thereto (yielding a smaller relative refractive index difference) and the outer cladding layer 702 with a smaller amount of F added thereto (yielding a greater relative refractive index difference), thereby constituting the cladding region 700.

In the cladding region 700 having such a two-layer structure, the inner cladding layer 701 positioned at the outer periphery of the core region 600 can efficiently confine the transmitted light into the core region 600 and its vicinity. On the other hand, the outer cladding layer 702 has an effect of adjusting transmission characteristics of the optical fiber, an effect of reducing the concentration of stress into the core, and the like. When the above-mentioned condition is applied to the average relative refractive index difference of the cladding region 700 as a whole combining the cladding layers 701, 702 together, the stress concentration into the core region 600 can reliably be suppressed.

As for the average relative refractive index differences $\Delta n_1$, $\Delta n_2$ in the cladding layers 701, 702, due to their relationship in magnitude, the average relative refractive index difference $\Delta n_2$ in the outer cladding layer 702 satisfies the condition of $$i\ \Delta n_2 \geq -0.26\%.$$

Preferably, in order to fully secure the effect of confining light into the core region 600 and the like, Cl is added to the core region 600 such that the average relative refractive index difference therein falls within the range of $0.01\% \leq \Delta n_0 \leq 0.12\%$. Since the Cl doping does not affect the transmission loss and the like greatly, the resulting core can be handled as with the pure $SiO_2$ core. It is also effective in lowering the viscosity of the core region 600. The refractive index distribution in the core region 600 can be either substantially constant or graded therewithin.

Figure 8:
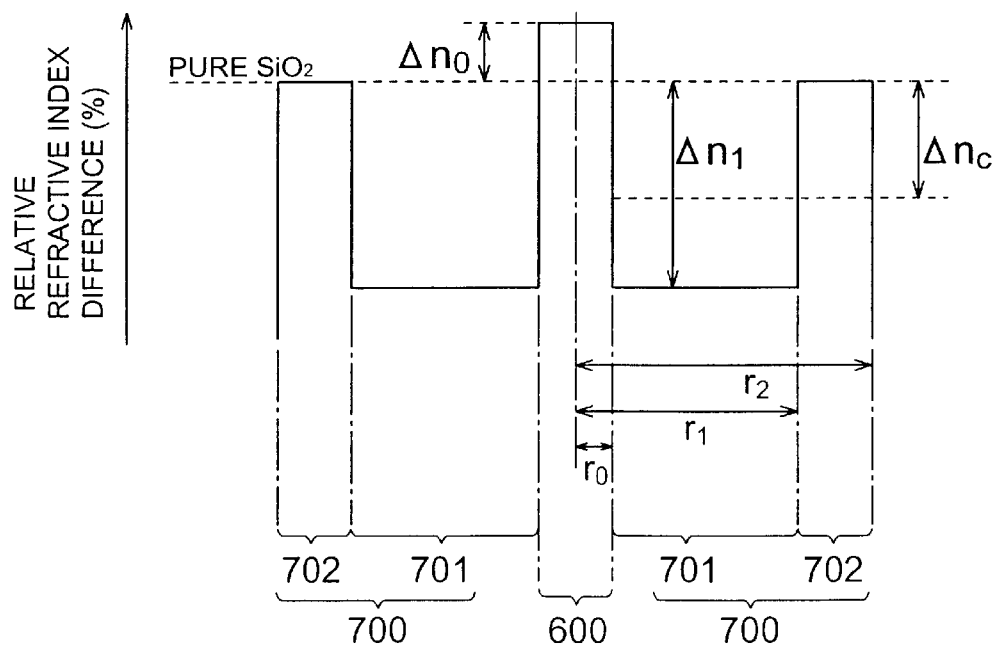
FIG. 8 is a chart showing the refractive index profile in a second embodiment of the second optical fiber.

FIG. 8 is a chart showing the refractive index profile of a second embodiment of the second optical fiber in accordance with the present invention.

As in the first embodiment, this optical fiber is an optical fiber of $SiO_2$ glass (silica glass) type; and comprises a core region 600 including the center axis of the optical fiber, and a cladding region 700 provided at the outer periphery of the core region 600.

The configurations of the core region 600 and cladding region 700 are substantially the same as those of the optical fiber shown in FIG. 7, but differ therefrom in the configuration of the outer cladding layer 702 of the cladding region 700. Namely, in this embodiment, the outer cladding layer 702 is not doped with F (fluorine), whereby it is made of pure $SiO_2$. Therefore, the average relative refractive index differences of the cladding regions 701 and 702 have a relationship of $0 = \Delta n_2 > \Delta n_1$.

The average relative refractive index difference $\Delta n_c$ of the whole cladding region 700 combining the inner cladding layer 701 with the average relative refractive index difference $\Delta n_1$ and the outer cladding layer 702 with the average relative refractive index difference $\Delta n_2 = 0$ is a value satisfying the above-mentioned condition of $\Delta n_c \geq -0.26\%$ (where $0 = \Delta n_2 > \Delta n_c > \Delta n_1$).

In the optical fiber of this embodiment, as in the first embodiment, the stress applied to the inside of the optical fiber is favorably dispersed into the adding region 700, whereby the stress concentration into the core is suppressed. As a consequence, the dependence of transmission loss upon the tension applied to the optical fiber at the time of drawing is reduced, which realizes an optical fiber whose transmission loss is fully reduced as a whole.

When the outer cladding layer 702 is made of pure $SiO_2$ as in this embodiment, it is preferred that the radius $r_1$ of the inner periphery of the outer cladding layer 702 (=the radius of the outer periphery of the inner cladding layer 701) and the radius $r_2$ of the outer periphery of the outer cladding layer 702 satisfy the relationship of $$r_2 - r_1 \leq r_2 \times 0.3$$

since it prevents light from leaking when the optical fiber is bent, and so forth. This condition corresponds to the state where the thickness of the outer cladding layer 702 is 30% or less of the whole optical fiber. This can yield a sufficient effect of suppressing the stress concentration into the core, and make the influence of the outer cladding layer over transmission characteristics fall within a preferred range.

Figure 9:
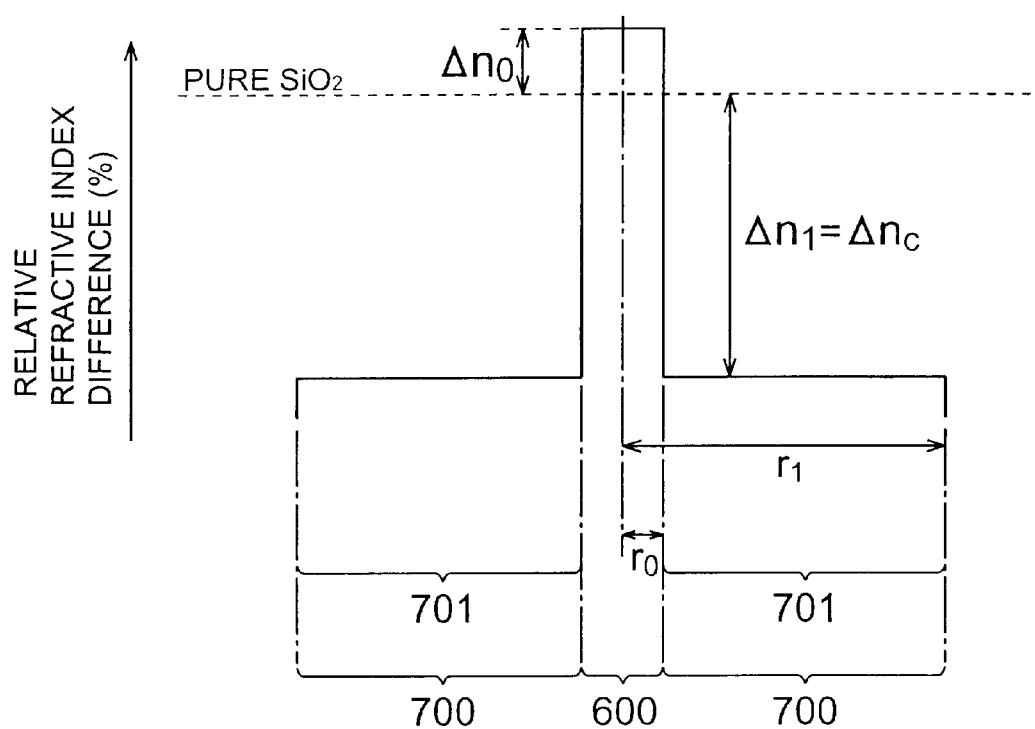
FIG. 9 is a chart showing the refractive index profile in a third embodiment of the second optical fiber.

FIG. 9 is a chart showing the refractive index profile of a third embodiment of the second optical fiber in accordance with the present invention.

As in the first and second embodiments, this optical fiber is an optical fiber of $SiO_2$ glass (silica glass) type; and comprises a core region 600 including the center axis of the optical fiber, and a cladding region 700 provided at the outer periphery of the core region 600. Here, the configuration of the core region 600 is substantially the same as that of the core regions 600 of the optical fibers shown in FIGS. 7 and 8.

On the other hand, the cladding region 700 in this embodiment has a single cladding layer 701. The cladding layer 701 is formed such that the outer periphery thereof has a radius of $r_1$. In the cladding layer 701, pure $SiO_2$ glass is doped with a predetermined amount of F (fluorine) as an additive for lowering the refractive index. As a consequence, the average relative refractive index difference in the cladding layer 701 is $\Delta n_1$ (where $\Delta n_1 < 0$).

The average relative refractive index difference $\Delta n_1$ of the cladding layer 701 corresponds to the average relative refractive index difference of the cladding region 700 as a whole, whereby the average relative refractive index difference $\Delta n_c = \Delta n_1$ is a value satisfying the above-mentioned condition of $\Delta n_c \geq -0.26\%$.

Thus, the stress applied to the inside of the optical fiber is favorably dispersed into the cladding region 700 not only in the configurations having a cladding region with a two-layer structure shown in the first and second embodiments, but also in those having a cladding region of a one-layer structure such as that of this embodiment and the like, whereby the stress concentration into the core is suppressed. As a consequence, the dependence of transmission loss upon the tension applied to the optical fiber at the time of drawing is reduced, which realizes an optical fiber whose transmission loss is fully reduced as a whole.

For the transmission loss reducing effect obtained by the second optical fiber of the present invention and the method of making the same, specific examples and comparative examples will be shown. Each of the optical fibers in the following examples and comparative examples except for the second comparative example was made by the manufacturing method using the annealing in the heating furnace shown in FIG. 1. The heating condition in the heating furnace for annealing was set such that the heating furnace had a center temperature of 1350° C., a length of 1.5 m at a linear velocity of 50 m/min, and a transit time of 1.8 seconds. The tension at the time of drawing was 0.10 N (10 gw) in all of them.

The optical fiber to become the first example was prepared according to the refractive index profile shown in FIG. 7. The individual radii $r_0$, $r_1$, and $r_2$ were set such that $2r_0 = 10$ $\mu$m, $2r_1 = 55$ $\mu$m, and $2r_2 = 125$ $\mu$m.

As for the refractive indices in the individual regions, the core region 600 was doped with Cl such that its average relative refractive index difference $\Delta n_0 = +0.08\%$. On the other hand, the inner cladding layer 701 of the cladding region 700 was doped with F such that its relative refractive index difference $\Delta n_1 = -0.28\%$. Also, the outer cladding layer 702 was doped with F such that its relative refractive index difference $\Delta n_2 = -0.20\%$. Here, the cladding region 700 as a whole exhibited an average relative refractive index difference of $\Delta n_c = -0.215\%$.

The optical fiber to become the second example was prepared according to the refractive index profile shown in FIG. 8. The individual radii $r_0$, $r_1$, and $r_2$ were set such that $2r_0 = 10$ $\mu$m, $2r_1 = 100$ $\mu$m, and $2r_2 = 125$ $\mu$m. Here, the outer cladding layer 702 had a thickness of $$r_2 - r_1 = r_2 \times 0.2 < r_2 \times 0.3.$$

As for the refractive indices in the individual regions, the core region 600 was doped with Cl such that its average relative refractive index difference $\Delta n_0 = +0.08\%$. On the other hand, the inner cladding layer 701 of the cladding region 700 was doped with F such that its average relative refractive index difference $\Delta n_1 = -0.28\%$. The outer cladding layer 702 was not doped with F, so as to be made of pure $SiO_2$, whereby its average relative refractive index difference $\Delta n_2 = 0.00\%$. Here, the cladding region 700 as a whole exhibited an average relative refractive index difference of $\Delta n_c = -0.178\%$.

The optical fiber to become the third example was prepared according to the refractive index profile shown in FIG. 9. The individual radii $r_0$ and $r_1$ were set such that $2r_0 = 10\,\mu m$ and $2r_1 = 125\,\mu m$.

As for the refractive indices in the individual regions, the core region 600 was doped with Cl such that its average relative refractive index difference $\Delta n_0 = +0.08\%$. On the other hand, the cladding layer 701 of the cladding region 700 was doped with F such that its average relative refractive index difference $\Delta n_c = \Delta n_1 = -0.26\%$.

Further, as the fourth example of the optical fiber, an optical fiber having the same configuration as that of the first example was made while the heating condition in the heating furnace for annealing was set to a transit time of 1.8 seconds at 1100° C.

For comparison with the foregoing first to fourth examples, optical fibers not satisfying the configurations mentioned above were made as first and second comparative examples.

The optical fiber to become the first comparative example was made with a configuration substantially the same as that of the third example according to the refractive index profile shown in FIG. 9. However, the cladding layer 701 of the cladding region 700 is doped with F such that its average relative refractive index difference $\Delta n_c = \Delta n_1 = -0.35\%$ ($< -0.26\%$).

The optical fiber to become the second comparative example was made with the same configuration as that of the above-mentioned first comparative example. However, in the drawing step thereof, the optical fiber was drawn without annealing in the heating furnace.

Table 2 shows the results of determination of the average relative refractive index difference $\Delta n_c$ of the cladding region 700, Rayleigh scattering coefficient A, structural asymmetry loss B (see the above-mentioned expression of transmission loss $\alpha_\lambda$), the transmission loss $\alpha_{1.00}$ at a wavelength of 1.00 $\mu m$, and the transmission loss $\alpha_{1.55}$ at a wavelength of 1.55 $\mu m$. Here, the transmission losses $\alpha_{1.00}$ and $\alpha_{1.55}$ are $$\alpha_{1.00} = A + B,$$

and $$\alpha_{1.55} = 0.17325 \times A + B + 0.016,$$

respectively.

TABLE 2

|  | $\Delta n_c$ | A | B | $\alpha_{1.00}$ | $\alpha_{1.55}$ |
|---|---|---|---|---|---|
| Example 1 | -0.215 | 0.790 | 0.008 | 0.798 | 0.159 |
| Example 2 | -0.178 | 0.800 | 0.008 | 0.808 | 0.161 |
| Example 3 | -0.260 | 0.780 | 0.011 | 0.791 | 0.162 |
| Example 4 | -0.215 | 0.810 | 0.010 | 0.820 | 0.164 |
| Comparative Example 1 | -0.350 | 0.800 | 0.015 | 0.815 | 0.169 |
| Comparative Example 2 | -0.350 | 0.850 | 0.008 | 0.858 | 0.170 |

(unit: $\alpha_{1.00}$, $\alpha_{1.55}$, B = dB/km; A = dB/km · $\mu m^4$)

First, as for the average relative refractive index difference $\Delta n_c$ in each optical fiber, the first to fourth examples satisfy the condition of $\Delta n_c \geq -0.26\%$, whereas $\Delta n_c < -0.26\%$ in the first and second comparative examples due to the doping of F exceeding the upper limit.

Next, as for the Rayleigh scattering coefficient A, structural asymmetry loss B, and transmission losses $\alpha_{1.00}$ and $\alpha_{1.55}$, the value of Rayleigh scattering coefficient A in the second comparative example made with the conventional structure without annealing is 0.850 dB/km·$\mu m^4$, which is identical to the above-mentioned reference value. The value of structural asymmetry loss B is 0.008 dB/km, and the total transmission loss $\alpha_{1.00}$ is 0.858 dB/km, which substantially equals the above-mentioned reference value. The transmission loss $\alpha_{1.55}$ is 0.170 dB/km.

In the first comparative example manufactured with the conventional structure with annealing, while the value of Rayleigh scattering coefficient A is reduced to 0.800 dB/km·$\mu m^4$, the structural asymmetry loss B increases to 0.015 dB/km upon annealing, whereby the transmission loss $\alpha_{1.55}$ as a whole is 0.169 dB/km and thus is not sufficiently reduced.

In each of the first to fourth examples, by contrast, both of the Rayleigh scattering coefficient A and structural asymmetry loss B are reduced, whereby the transmission losses $\alpha_{1.00}$ and $\alpha_{1.55}$ are sufficiently reduced as a whole.

Namely, in the first example having a cladding region of a two-layer structure, the Rayleigh scattering coefficient A is reduced to 0.790 dB/km·$\mu m^4$, and the structural asymmetry loss B is prevented from increasing and becomes 0.008 dB/km at the same time. The total transmission losses $\alpha_{1.00}$ and $\alpha_{1.55}$ are 0.798 dB/km and 0.159 dB/km, respectively, thus being reduced sufficiently.

Also, as in the first example, the transmission loss is sufficiently reduced as a whole in the second example having a two-layer structure whose outer cladding layer is made of pure $SiO_2$ and the third example having a one-layer structure. Further, as in the first example, the transmission loss is fully reduced as a whole in the fourth example in which the heating condition is altered.

In view of the foregoing, while using a manufacturing method having an effect of reducing the Rayleigh scattering loss such as a manufacturing method by use of annealing, concerning the configuration of the core and cladding regions of an optical fiber or optical fiber preform, the core region is made of a pure $SiO_2$ core or a Cl-doped $SiO_2$ core similar thereto, and the cladding region has a configuration doped with F so as to satisfy the condition of $\Delta n_c \geq -0.26\%$, thus realizing an optical fiber which can reliably reduce the transmission loss as a whole by securely reducing the Rayleigh scattering loss, and preventing transmission loss components such as the structural asymmetry loss other than the Rayleigh scattering loss from occurring and increasing; and a method of making the same.

In the first example having a two-layer structure, the average relative refractive index difference of the outer cladding layer 702 is $\Delta n_2 = -0.20\%$. This average relative refractive index difference can be made greater. Since the radius of the inner periphery of the outer cladding layer 702 is relatively small such that $2r_1 = 55\,\mu m$, the upper limit in this example is assumed to be $\Delta n_2 = -0.1\%$ or so. If a value greater than that is to be taken, it will be preferred that the thickness of the outer cladding layer be made smaller as in the second example.

When the dependence of the transmission loss $\alpha_{1.55}$ at a wavelength of 1.55 μm on tension was studied in the first example, it was 0.175 dB/km, 0.170 dB/km, 0.163 dB/km, 0.159 dB/km, 0.164 dB/km, 0.170 dB/km, and 0.175 dB/km at tensions of 0.04 N, 0.05 N, 0.08 N, 0.10 N, 0.16 N, 0.20 N, and 0.25 N, respectively. From these results, a preferred tension value range concerning the tension at the time of drawing is considered to be the range of 0.05 to 0.20 N.

The optical fiber in accordance with the present invention and the method of making the same are not restricted to the above-mentioned embodiments and examples, but various modifications and configurational changes are possible. For example, the method of making the optical fiber is not limited to the manufacturing method by use of the drawing apparatus having the configuration shown in FIG. 1, but any drawing apparatus comprising other configurations may be used as long as it is equipped with a heating furnace for annealing. Also, manufacturing methods reducing the Rayleigh scattering loss by techniques other than annealing may be used.

The configuration of the optical fiber or optical fiber preform can be modified in various manners. For the first optical fiber, not only those of the examples shown in FIGS. 3 and 4, but also optical fibers having various structures may be used as long as they satisfy the viscosity ratio condition of $R\eta \leq 2.5$. For example, each of dispersion-compensating fibers and dispersion-shifted fibers normally has a low viscosity ratio $R\eta$ of 2.5 or less, thereby being able to yield an effect of reducing the transmission loss as in the above-mentioned examples.

For the second optical fiber, not only the embodiments shown in FIGS. 7 to 9, but also optical fibers having various structures may be used as long as they satisfy the above-mentioned configurational condition concerning the configuration of the cladding region, for example. Though the core region has a configuration doped with Cl in FIGS. 7 to 9, it may be a core made of pure $SiO_2$.

As explained in detail in the foregoing, the optical fiber in accordance with the present invention and the method of making the same yield effects as follows. Namely, in the optical fiber and its manufacturing method using a configuration of the optical fiber or a manufacturing method which can reduce the Rayleigh scattering loss and causing the viscosity ratio $R\eta=\eta_0/\eta_t$ between the core average viscosity $\eta_0$ and the total average viscosity $\eta_t$ to become 2.5 or less, the Rayleigh scattering loss can reliably be reduced by at least 5%, so as to become 95% or less of a reference value and, at the same time, other transmission loss components such as the structural asymmetry loss are restrained from occurring and increasing. Therefore, an optical fiber whose transmission loss as a whole is fully reduced is obtained.

Also, in the optical fiber and its manufacturing method using a configuration of the optical fiber or a manufacturing method which can reduce the Rayleigh scattering loss, making the core region from pure $SiO_2$ or Cl-doped $SiO_2$, and doping the cladding region with F (fluorine) with an amount in a range satisfying $\Delta n_c \geq -0.26\%$, the Rayleigh scattering loss is reliably reduced and, at the same time, other transmission loss components such as the structural asymmetry loss are restrained from occurring and increasing, whereby an optical fiber which can reliably reduce the transmission loss as a whole, and a method of making the same are realized.

The optical fiber obtained according to the above-mentioned configuration and manufacturing method has a very low transmission loss, so that, when employed in a long-distance optical transmission system, it can construct an efficient optical transmission system which can reduce the number of relay points in which optical amplifiers and the like are installed, for example.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising a core region, and a cladding region disposed at an outer periphery of said core region;

wherein the core average viscosity $\eta_0$ at a cross section within said core region and the total average viscosity $\eta_t$ at a total cross section combining said core region and cladding region together have a viscosity ratio $R\eta=\eta_0/\eta_t$ of 2.5 or less; and wherein said optical fiber has a Rayleigh scattering loss which is 95% or less of a predetermined reference value.

2. An optical fiber according to claim 1, wherein said viscosity ratio $R\eta$ is determined by the relational expression of $$R\eta=\sigma z/(f/\pi r_1^2)$$

where $\sigma z$ is the tension component of a residual stress in an optical axis direction, f is the tension at the time of drawing, and $r_1$ is the radius of the outer periphery of said cladding region.

3. An optical fiber according to claim 1, wherein, while a Rayleigh scattering coefficient A (dB/km·μm$^4$) is used as an index for said Rayleigh scattering loss, said Rayleigh scattering coefficient A is not greater than 95% of a reference value $A_0$ expressed by $$A_0=0.85+0.29[Ge]$$

where [Ge] is the amount of addition of Ge to said core region expressed by the relative refractive index difference with respect to pure $SiO_2$ in terms of %.

4. An optical fiber according to claim 1, wherein a transmission loss $\alpha_{1.00}$ (dB/km) at a wavelength of 1.00 μm is not greater than 95% of a reference value $\alpha_0$ expressed by $$\alpha_0=0.86+0.29[Ge]$$

where [Ge] is the amount of addition of Ge to said core region expressed by the relative refractive index difference with respect to pure $SiO_2$ in terms of %.

5. An optical fiber according to claim 1, wherein the tension component of a residual stress in an optical axis direction is 20 MPa or less, or said residual stress combining said tension component and a thermal expansion component is 30 MPa or less.

6. An optical fiber comprising a core region constituted by pure $SiO_2$ or $SiO_2$ doped with chlorine, and a cladding region disposed at an outer periphery of said core region;

wherein said cladding region is doped with fluorine so as to yield an average relative refractive index difference $\Delta n_c$ satisfying the condition of $$\Delta n_c \geq -0.26\%$$

when the relative refractive index difference in each part is defined as being expressed in terms of % with reference to the refractive index in pure $SiO_2$; and wherein said optical fiber exhibits a Rayleigh scattering coefficient A of 0.81 dB/km·$\mu$m$^4$ or less, or a transmission loss $\alpha_{1.00}$ of 0.82 dB/km or less at a wavelength of 1.00 $\mu$m.

7. An optical fiber according to claim 6, wherein said cladding region comprises two layers of cladding constituted by an inner cladding layer disposed at an outer periphery of said core region and an outer cladding layer disposed at an outer periphery of said inner cladding layer; and wherein said outer cladding layer has an average relative refractive index difference $\Delta n_2$ greater than the average relative refractive index difference $\Delta n_1$ in said inner cladding layer and satisfies the condition of $$\Delta n_2 \geq -0.26\%.$$

8. An optical fiber according to claim 7, wherein said outer cladding layer is made of pure SiO$_2$; and wherein said outer cladding layer has a radius $r_1$ of an inner periphery and a radius $r_2$ of an outer periphery satisfying the condition of $$r_2 - r_1 \leq r_2 \times 0.3.$$

9. An optical fiber according to claim 6, wherein said core region is doped with chlorine so as to yield an average relative refractive index difference $\Delta n_0$ satisfying the condition of $$0.01\% \leq \Delta n_0 \leq 0.12\%.$$

10. A method of making an optical fiber, said method comprising the steps of:

preparing an optical fiber preform comprising a core region and a cladding region provided at an outer periphery of said core region, in which the core average viscosity $\eta_0$ at a cross section within said core region and the total average viscosity $\eta_t$ at a total cross section combining said core region and cladding region together have a viscosity ratio $R\eta = \eta_0/\eta_t$ of 2.5 or less;

drawing said optical fiber preform upon heating; and heating an optical fiber drawn out of a drawing furnace by use of a heating furnace disposed downstream said drawing furnace such that said optical fiber attains a temperature within a predetermined temperature range.

11. A method of making an optical fiber according to claim 10, wherein said heating furnace heats said drawn optical fiber such that said optical fiber attains a temperature within the range of 1100° C. to 1700° C.

12. A method of making an optical fiber, said method comprising the steps of:

preparing an optical fiber preform comprising a core region constituted by pure SiO$_2$ or SiO$_2$ doped with chlorine, and a cladding region provided at an outer periphery of said core region, wherein said cladding region is doped with fluorine so as to yield an average relative refractive index difference $\Delta n_c$ satisfying the condition of $$\Delta n_c \geq -0.26\%$$

when the relative refractive index difference in each part is defined as being expressed in terms of % with reference to the refractive index in pure SiO$_2$;

drawing said optical fiber preform upon heating; and heating an optical fiber drawn out of a drawing furnace by use of a heating furnace disposed downstream said drawing furnace such that said optical fiber attains a temperature within a predetermined temperature range, so as to yield an optical fiber exhibiting a Rayleigh scattering coefficient A of 0.81 dB/km·$\mu$m$^4$ or less, or a transmission loss $\alpha_{1.00}$ of 0.82 dB/km or less at a wavelength of 1.00 $\mu$m.

13. A method of making an optical fiber according to claim 12, wherein said heating furnace heats said drawn optical fiber such that said optical fiber attains a temperature within the range of 1100° C. to 1700° C.

14. A method of making an optical fiber, said method comprising the steps of:

preparing an optical fiber preform comprising a core region constituted by pure SiO$_2$ or SiO$_2$ doped with chlorine, and a cladding region provided at an outer periphery of said core region, wherein said cladding region is doped with fluorine so as to yield an average relative refractive index difference $\Delta n_c$ satisfying the condition of $$\Delta n_c \geq -0.26\%$$

when the relative refractive index difference in each part is defined as being expressed in terms of % with reference to the refractive index in pure SiO$_2$; and when drawing said optical fiber preform upon heating, drawing said optical fiber preform at a tension within the range of 0.05 to 0.20 N, so as to yield an optical fiber exhibiting a Rayleigh scattering coefficient A of 0.81 dB/km·$\mu$m$^4$ or less, or a transmission loss $\alpha_{1.00}$ of 0.82 dB/km or less at a wavelength of 1.00 $\mu$m.

\* \* \* \* \*